US008140659B2

(12) United States Patent
Carl et al.

(10) Patent No.: US 8,140,659 B2
(45) Date of Patent: Mar. 20, 2012

(54) CALCULATING AN ESTIMATED TIME TO COMPLETE A REQUEST

(75) Inventors: Michael R. Carl, Plano, TX (US); Steve R. Landherr, Dallas, TX (US); Tom E. Turicchi, Dallas, TX (US); Shinobu Togasaki, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2287 days.

(21) Appl. No.: 09/850,794

(22) Filed: May 8, 2001

(65) Prior Publication Data
US 2002/0174214 A1 Nov. 21, 2002

(51) Int. Cl.
*G06F 15/16* (2006.01)
(52) U.S. Cl. .......................... 709/224; 718/101; 718/102
(58) Field of Classification Search .................. 709/203, 709/224, 233; 718/101, 102
See application file for complete search history.

(56) References Cited

U.S. PATENT DOCUMENTS

| 5,375,070 | A | * | 12/1994 | Hershey et al. | 709/224 |
| 5,657,450 | A | * | 8/1997 | Rao et al. | 707/10 |
| 5,734,884 | A | * | 3/1998 | Eberhard et al. | 707/2 |
| 5,764,912 | A | * | 6/1998 | Rosborough | 709/224 |
| 5,913,041 | A | * | 6/1999 | Ramanathan et al. | 709/233 |
| 6,041,041 | A | * | 3/2000 | Ramanathan et al. | 370/241 |
| 6,144,961 | A | * | 11/2000 | de la Salle | 707/10 |
| 6,393,480 | B1 | * | 5/2002 | Qin et al. | 709/224 |
| 6,438,592 | B1 | * | 8/2002 | Killian | 709/224 |
| 6,539,445 | B1 | * | 3/2003 | Krum | 710/110 |
| 6,598,077 | B2 | * | 7/2003 | Primak et al. | 709/219 |
| 6,701,363 | B1 | * | 3/2004 | Chiu et al. | 709/224 |
| 6,748,413 | B1 | * | 6/2004 | Bournas | 718/105 |
| 6,973,489 | B1 | * | 12/2005 | Levy | 709/224 |
| 7,133,911 | B1 | * | 11/2006 | Schaffer et al. | 709/224 |
| 7,409,676 | B2 | * | 8/2008 | Agarwal et al. | 717/120 |

FOREIGN PATENT DOCUMENTS

| JP | 8082685 | 3/1996 |
| JP | 10143719 | 5/1998 |

* cited by examiner

*Primary Examiner* — Kevin Bates

(57) ABSTRACT

The present invention provides estimated completion time related to an Internet transaction to a user device. The present invention stores completion time information in a repository or repositories. Moreover, the present invention correlates a received Internet transaction message with previously stored completion time information. Utilizing the previously stored completion time information, the present invention generates estimated completion times. The present invention may communicate the completion time to the user device for display by a widget or control associated with a browser plug in.

21 Claims, 2 Drawing Sheets

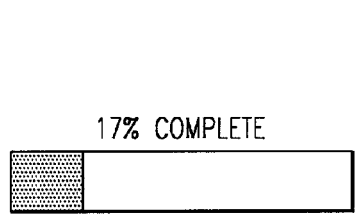  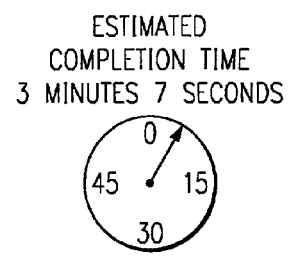
FIG. 3A   FIG. 3B   FIG. 3C
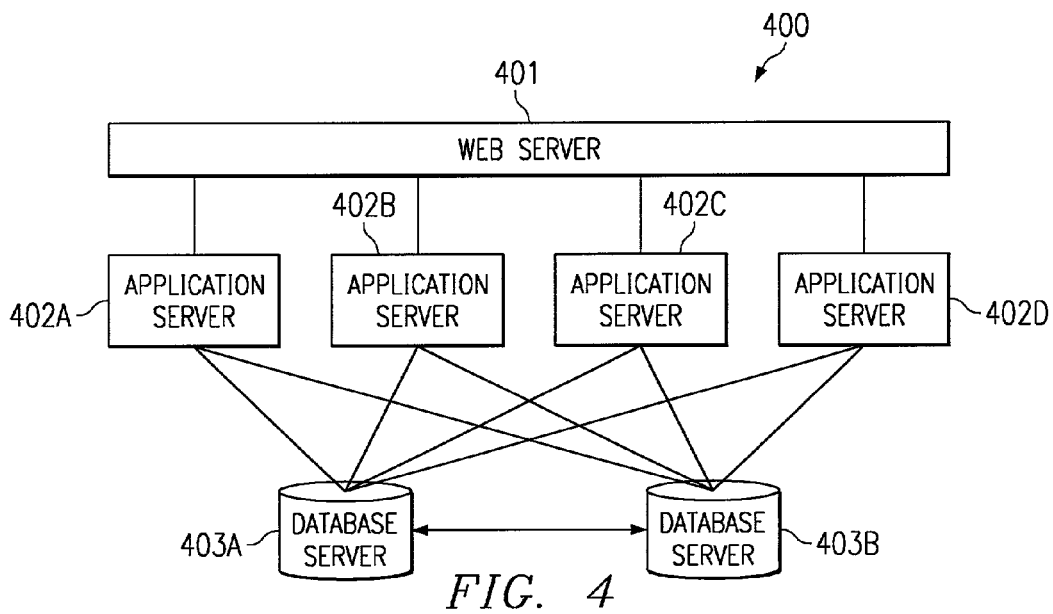
FIG. 4
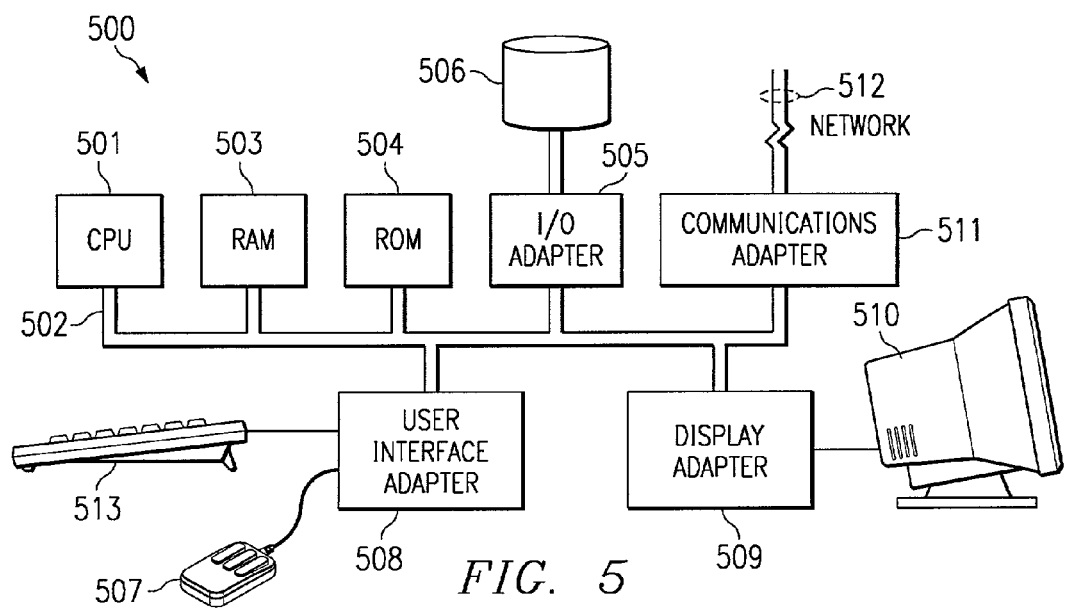
FIG. 5

CALCULATING AN ESTIMATED TIME TO COMPLETE A REQUEST

TECHNICAL FIELD

The present invention relates generally to providing Internet transaction time estimates and more particularly to a system and method for providing Internet transaction time estimates via hierarchical performance summaries and a browser plug in.

BACKGROUND

At the present time, browser technology for accessing content on the web, performing database searches, and completing commercial transactions has become quite prevalent. Specifically, many search engines and web sites provide the capacity to execute relatively detailed boolean content queries from browser users to locate specific content. In one example, certain court systems allow users to provide a boolean query to perform a content search of judicial decisions.

The length of time required to perform such transactions or searches varies widely. The length of time is dependent upon a number of factors. For example, a web server performing such a search may exhibit performance degradation if the web server is executing a number of threads to simultaneously process a number of transactions or searches. Clearly, the length of time to perform such a search is dependent upon the amount of data to be examined. For example, a content query associated with a search engine that requires examination of innumerable cached web sites requires much more processing capacity than a simple search of a small entity web site.

At the present time, communication of the length of time required to perform a transaction is not provided to users. Instead, some time information is provided to users concerning the data transfer rate. A browser may display a data transfer rate of 18 kbps. Alternatively, a browser may display a percentage of information that remains to be downloaded. For example, a web server may communicate that a certain transaction will cause a file of 1.4 megabytes to be downloaded. The browser may provide a small graphical display indicating the amount of the file that has been downloaded at a given time. However, this information solely pertains to communication between threads operating on a user's computer system and a particular web site. The information does not tell a user anything about processing that occurs solely within the web server.

SUMMARY OF THE INVENTION

The present invention is directed to a system and method which provide estimated Internet transaction time estimates to user devices. Specifically, the present invention operates to provide an estimate to a user of the amount of internal processing time related to an Internet transaction. The present invention is able to provide estimates to users by storing previous completion time information in a repository or repositories. In a preferred embodiment, the previous completion time information is associated within distinct processing layers of the web server architecture that completes the Internet transactions. When an Internet request is received from a user device, the Internet request is correlated with categories of previous requests. The present invention then preferably retrieves previous completion time information based upon the correlation. The retrieved completion time information is utilized to provide a completion time estimate to the user device. In the preferred embodiment, the completion time estimate is provided to the user via a widget or graphical control associated with a browser application.

BRIEF DESCRIPTION OF THE DRAWING

FIG. 3A depicts an exemplary icon that may be to display a performance summary in accordance with the present invention.

FIG. 3B depicts another exemplary icon that may be to display a performance summary in accordance with the present invention.

FIG. 3C depicts another exemplary icon that may be to display a performance summary in accordance with the present invention.

FIG. 4 depicts an exemplary configuration of a distributed web server architecture for providing web server functionality in accordance with the present invention.

FIG. 5 depicts a block diagram of a computer system which is adapted to use the present invention.

DETAILED DESCRIPTION

Figure 1:
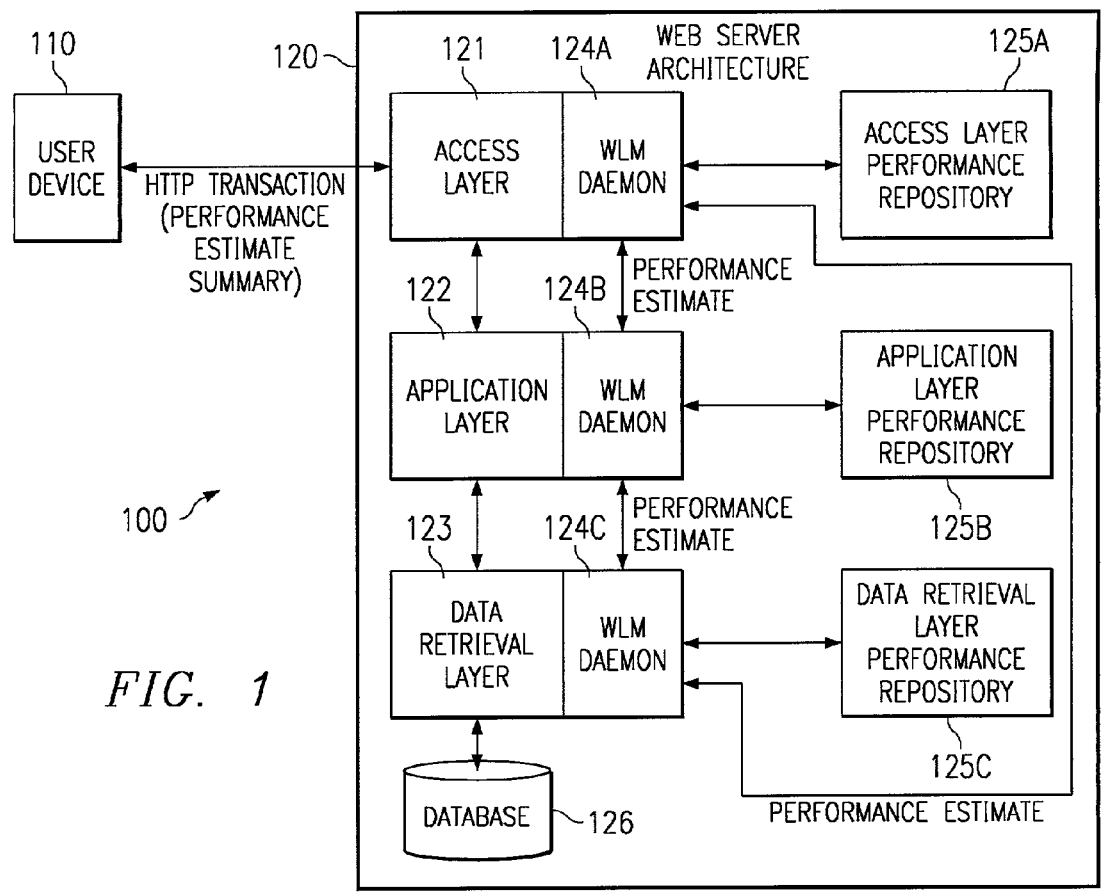
FIG. 1 depicts a high level block diagram of a web server architecture communicating with a user system in accordance with the present invention.

FIG. 1 depicts a high level block diagram of a web server communicating with a user system in accordance with the present invention. FIG. 1 depicts system 100. System 100 comprises user device 110 and web server architecture 120.

User device 110 may be an ordinary personal computer executing an Internet user application such as a browser application. Alternatively, user device 110 may be any other processor-based device capable of communicating via the Internet such as an Internet capable cellular phone or a personal digital assistant (PDA). User device 110 is capable of communicating with web server architecture 120 via the Internet. For example, user device 110 may utilize a number of mechanisms to access the Internet. User device 110 may utilize a dial-up Internet Service Provider (ISP). User device 110 may connect to an ISP via a digital subscriber line (DSL) connection. User device 110 may be connected to an intermediate network to gain access to the Internet. For example, user device 110 may be a device disposed on a LAN or WAN. User device 110 may communicate via the Internet through the intermediate communication mechanisms of the LAN or WAN.

Web server architecture 120 receives information via the Internet to process various types of transactions. Web server architecture 120 may be implemented in any number of configurations. As depicted in FIG. 1, web server architecture 120 is configured utilizing a distributed architecture. Web server architecture 120 includes three distinct computer architectures: access layer 121, application layer 122, and data retrieval layer 123. Each of the distinct computer architectures includes a daemon (WLM daemons 124A, 124B, and 124C) to perform performance monitoring and performance estimation. A daemon is a process or thread that runs in the background and performs a specified operation at predefined times or in response to certain events. The term daemon is a UNIX term, although many other operating systems provide support for daemons. Web server architecture 120 comprises several data storage structures including access layer performance repository 125A, application layer performance repository 125B, data retrieval layer repository 125C, and database 126.

Access layer 121 may be implemented utilizing one or several low end computers (generally comprising 1-2 CPUs). Access layer 121 is responsible for managing incoming requests such as hyper text transfer protocol (HTTP) transaction messages. For example, user device 110 may communicate an HTTP transaction message that requests a certain resource associated with web server architecture 120. The HTTP transaction message is communicated over the Internet by transmitting the HTTP transaction message as a series of packets directed to a defined port on web server architecture 120. In TCP/IP and UDP networks, a port is an endpoint to a logical connection. For example, port 80 is typically used for HTTP traffic. Daemons associated with access layer 121 monitor the incoming traffic received from the appropriate port. When an appropriate daemon detects an incoming HTTP transaction message, it may dispatch a thread to handle the request, i.e., to generate a response HTTP message. In an example, the daemon may implement common gateway interface (CGI) protocols. In such protocols, the daemon may receive the incoming HTTP message and place the HTTP message into a data stream to be processed by a dispatched thread associated with application layer 122.

Application layer 122 represents an intermediate layer of one or several midrange computer systems (generally 1-4 CPUs) where the web applications are executed. The web applications may be implemented as threads that are dispatched by appropriate access layer 121 daemons. For example, a dispatched thread may remove the HTTP incoming message from the STDIN data stream as described in CGI protocol schemes. STDIN is a well known programming term for standard input data stream. The dispatched thread may parse the incoming HTTP message to remove data associated with pertinent fields. For example, the dispatched thread may remove a customer identification number and a password. Alternatively, the dispatched thread may remove pertinent query parameters. Utilizing the received data removed from the incoming HTTP transaction message, the dispatched thread generates response data. For example, the dispatched thread may formulate a standard query language (SQL) query for provision to the appropriate daemon associated with data retrieval layer 123. After receiving query response information, the dispatched thread may format the response information appropriately. The dispatched thread may communicate the formatted information to user device 110 by, for example, writing the formatted information to STDOUT data stream. STDOUT is a standard programming term for standard output data stream.

Data retrieval layer 123 may be implemented as one or several high-end computer systems (generally more than 4 CPUs) that serve databases. Daemons or threads associated with data retrieval layer 123 facilitate access to stored data such as information retained in database 126. The daemons or threads may provide a SQL database interface to database 126. Alternatively, the daemons or threads may may be implemented as any other software interface that allows access to stored data. The stored data may represent any type of information. For example, the stored data may reflect securities held in customer accounts. The stored data may also represent cached content associated with web pages. The stored data may also represent various documents such as technical papers.

Although the preceding has discussed processing in terms of a plurality of layers, it shall be appreciated that any particular layer is not required to practice the present invention. Also, a particular layer might not be involved for every HTTP transaction. For example, a specific HTTP transaction might not involve data retrieval layer 123. Another HTTP transaction might not require application layer 122. Additionally, it shall be appreciated that although the preceding has described the present invention in terms of a distributed architecture, such a configuration is not required. The present invention may be implemented on a single system if appropriate for a particular application.

WLM daemons 124A-124C respectively monitor layer performance associated with access layer 121, application layer 122, and data retrieval layer 123. WLM daemons 124A-124C monitor the various layers to determine the time required to perform certain tasks. For example, an exemplary web server architecture 120 may implement an Internet ordering system. In this example, WLM daemon 124B may monitor application layer 122 to determine the times required to purchase certain products. Additionally, the transactions may be further monitored to determine the time associated with certain quantities and certain associated services such as scheduling delivery times. As another example, WLM daemon 124C may monitor performance information related to the complexity of an SQL query, the location of the actual stored data (whether the data is stored locally or remotely or stored on a particular drive or type of media), and/or the like. WLM daemon 124A may monitor performance information such as information related to the number of access layer threads being concurrently executed. WLM daemons 124A-124C may respectively store the performance information in access layer performance repository 125A, application layer performance repository 125B, and data retrieval layer performance repository 125C. Each WLM daemon is preferably given exclusive write access to its repository and each WLM daemon is preferably given access to read from each repository. Of course, the various repositories need not be implemented separately. WLM daemons 124A-124C may place the performance information into a single repository. It shall be appreciated that the preceding examples are merely exemplary. WLM daemons 124A-124C may monitor layer performance related to any particular type of transaction or any type of criteria.

It shall be appreciated that user device 110 and web server architecture 120 may comprise any number of additional applications, threads, processes, daemons, data structures, boards, ports, interfaces, and other components. User device 110 and web server architecture 120 are depicted at a high level solely for the purpose of describing the present invention. The descriptions of user device 110 and web server architecture 120 are merely exemplary and are not intended to limit the scope of the present invention.

In operation, system 100 may provide completion of an HTTP transaction. Specifically, an individual associated with user device 110 may utilize a browser application to generate an HTTP transaction message for communication to web server architecture 120. User device 110 may communicate the HTTP transaction message to web server architecture 120 via the Internet. The HTTP transaction message is received by a daemon associated with access layer 121 via the appropriate port. The daemon determines the current load on web server architecture 120 and causes a thread to be dispatched to handle the HTTP transaction message.

At this point, the thread communicates with WLM daemon 124A. WLM daemon 124A examines the HTTP transaction message to compare the transaction to predefined criteria. WLM daemon 124A then retrieves performance information from access layer performance repository 125A based upon the comparison to thereby calculate a performance estimate. Likewise, WLM daemons 124B and 124C calculate performance estimates. WLM daemons 124B and 124C may communicate performance estimates to WLM daemon 124A. The communication may be direct. Alternatively, WLM daemon 124C may communicate its estimate to WLM daemon 124B which in turn communicates the estimate to WLM daemon 124A.

Upon the receipt of performance estimates associated with each layer, WLM daemon 124A possesses sufficient information to estimate the total amount of time required for internal processing of the transaction. Also, WLM daemon 124A possesses an estimate of the size of the return HTTP transaction message. WLM daemon 124A communicates this information to a thread dispatched by access layer 121. The thread determines latency and/or bandwidth associated with the Internet connection between web server architecture 120 and user device 110. Utilizing the information received from WLM daemon 124A and the latency and bandwidth information, the thread calculates a performance estimate summary. The performance estimate summary is reflective of the total amount of time that user device 110 must wait until it receives all of the response HTTP transaction message.

In an embodiment, this information is presented to a user through a web transaction monitor widget (WTMW). The WTMW may be implemented as a graphical display or control that provides the performance summary estimate to an individual operating user device 110. Specifically, the WTMW may tell the user how long the transaction may take and what percentage has been completed. The WTMW is discussed in greater detail with respect to FIGS. 2, 3A, 3B, and 3C.

Additionally or alternatively, WLM daemons 124A-124C may communicate during the course of the processing of the HTTP transaction. Specifically, when access layer 121, application layer 122, and data retrieval layer 123 complete their various tasks, WLM daemons 124A-124C store the total amount of time expended performing the various tasks in the various repositories. By doing so, WLM daemons 124A-124C may constantly update transaction types and transaction times. Thus, performance information may reflect the most current performance characteristics of web server architecture 120.

It shall be appreciated that additional information may be communicated to user device 110. For example, when data retrieval layer 123 completes retrieval of data associated with a transaction, this information may be communicated back to user device 110. This may cause an update to occur on the WTMW. For example, this may cause a certain task completed percentage to be displayed.

Figure 2:
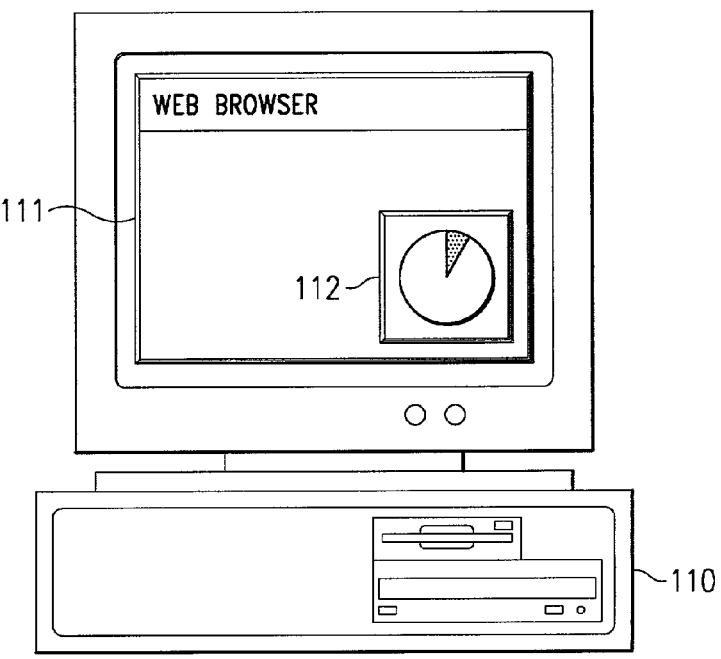
FIG. 2 depicts an illustrative view of user device 110 implemented according to the present invention.

FIG. 2 depicts an illustrative view of user device 110 implemented according to the present invention. User device 110 is executing web browser 111. User device 110 has issued an HTTP transaction message. Accordingly, user device 110 has received performance summary information. User device 110 has utilized the performance summary information to generate web transaction monitor widget (WTMW) 112. WTMW 112 is displayed on a frame associated with web browser 111. Alternatively, WTMW 112 could be displayed elsewhere if desired. WTMW 112 could be displayed by a JAVA plug in associated with web browser 111. The JAVA plug in may allow a user to select a number of options related to display of WTMW 112. The user may control the size, color, placement, and/or the like of WTMW 112. The user may control the particular icon utilized for the display of WTMW 112. FIGS. 3A, 3B, and 3C depict exemplary icons that may be utilized for WTMW 112. Of course, the provided depictions are merely exemplary and any icon may be utilized. Also, it shall be appreciated that WTMW 112 need not be presented by a JAVA plug in. Any other type of plug in, program, or script may be utilized.

The preceding discussion has described web server architecture 120 at a high level. However, web sites that manage very large sets of data and receive large numbers of transactions from users are not necessarily implemented utilizing such a configuration. FIG. 4 depicts an exemplary configuration of a distributed approach to providing web server functionality. Distributed web server 400 comprises web server 401, application servers 402A-402D, and database server 403A and database server 403B.

In operation, an HTTP transaction message is first directed to the appropriate port associated with web server 401 by the TCP/IP or UDP protocol used to transport the HTTP message. Web server 401 ascertains the current work load associated with distributed web server 400. Specifically, it is determined whether any particular resource is being over or under utilized. In response to the work load determination, web server 401 redirects the HTTP message to one of application servers 402A-402C. A thread is dispatched on the selected application server 402A-402C to process the HTTP message.

In such an environment, the present invention may be utilized to perform load balancing in addition to providing completion time estimates to user devices. Specifically, performance summaries may be utilized to select the most efficient resource of distributed resource to utilize a particular HTTP transaction. If one application server offers superior performance at a particular time, it may be selected. Additionally or alternatively, if a particular database server offers superior performance at a particular time, it may be selected.

It shall be appreciated that the load balancing is not limited to configurations similar to distributed web server 400. Loading balancing may be applied to select any system resource upon the basis of monitored performance statistics. For example, a multiprocessor application may be utilized. The load balancing may be performed to select a particular processor or processors of the multiprocessor application server to execute the HTTP transaction handling thread or threads.

It shall be appreciated that the present invention provides numerous advantages. Specifically, the attention span of Internet users is quite small. Specifically, many Internet users will abandon a transaction or attempt to access another web site, if a web site does not respond within a number of seconds. Accordingly, the present invention provides very early feedback indicating that the user's transaction has been received and is being processed. Specifically, the WTMW may be provided in a very short amount of time. Additionally, the present invention may provide the user with an accurate estimate of the amount of internal processing required for a particular access or transaction. The user may intelligently decide whether to try again later or continue. The user is enabled to pursue other tasks for an appropriate amount of time. The user may come back to his or her browser at the appropriate time without repeatedly checking to determine whether the transaction has been completed.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 5 illustrates computer system 500 adapted to use the present invention. Central processing unit (CPU) 501 is coupled to system bus 502. The CPU 501 may be any general purpose CPU, such as an HP PA-8500 or Intel Pentium processor. However, the present invention is not restricted by the architecture of CPU 501 as long as CPU 501 supports the inventive operations as described herein. Additionally, system 500 may be implemented as a multiprocessor architecture comprising any number of CPUs if desired. Bus 502 is coupled to random access memory (RAM) 503, which may be SRAM, DRAM, SDRAM, or any other type of volatile memory. ROM 504 is also coupled to bus 502, which may be PROM, EPROM, or EEPROM. RAM 503 and ROM 504 hold user and system data and programs as is well known in the art.

Bus 502 is also coupled to input/output (I/O) controller card 505, communications adapter card 511, user interface card 508, and display card 509. The I/O card 505 connects to storage devices 506, such as one or more of hard drive, CD drive, floppy disk drive, tape drive, to the computer system. Communications card 511 is adapted to couple the computer system 500 to a network 512, which may be one or more of telephone network, local (LAN) and/or wide-area (WAN) network, Ethernet network, and/or Internet network. User interface card 508 couples user input devices, such as keyboard 513 and pointing device 507, to the computer system 500. The display card 509 is driven by CPU 501 to control the display on display device 510.

What is claimed is:

1. A method of operating a server, comprising:
monitoring completion times associated with an access layer, an application layer, and a data retrieval layer of said server separately, wherein said access layer is to manage incoming requests, said application layer is to process content of the incoming requests, and said data retrieval layer is to access stored data;
receiving a particular incoming request from a remote requestor device via said access layer of said server, wherein said access layer is to dispatch threads of said access layer to handle corresponding incoming requests;
monitoring a number of the threads of said access layer that are concurrently executing in the server;
calculating an estimated time to complete said particular incoming request based on the monitored completion time of said access layer, the monitored completion time of said application layer, the monitored completion time of said data retrieval layer, and the monitored number of the threads of said access layer that are concurrently executing in the server; and
communicating said estimated time to said remote requestor device.

2. The method of claim 1, further comprising:
calculating estimated times for processing the particular incoming request at corresponding ones of said access layer, application layer, and data retrieval layer; and
combining the estimated times for corresponding ones of said access layer, application layer, and data retrieval layer to calculate the estimated time to complete the particular incoming request.

3. The method of claim 2, wherein the monitored completion times are stored in at least one repository, the method further comprising:
storing the estimated times for corresponding ones of said access layer, application layer, and data retrieval layer in the at least one repository.

4. The method of claim 3, further comprising:
receiving a second incoming request from the remote requestor device via said access layer;
calculating a second estimated time to complete said second incoming request based on the monitored completion times and the estimated times stored in the at least one repository and the monitored number of the threads of said access layer that are concurrently executing in the server; and
communicating said second estimated time to said remote requestor device.

5. The method of claim 1, further comprising:
determining a latency associated with a network between said remote requestor device and said server,
wherein the estimated time is further calculated based on the determined latency.

6. The method of claim 1, further comprising:
determining an estimated amount of data to be communicated to said remote requestor device,
wherein the estimated time is further based on the estimated amount of data.

7. The method of claim 1 further comprising:
communicating completion of processing of the particular incoming request by each of said access layer, application layer, and access layer.

8. The method of claim 1 wherein said server is a distributed server.

9. The method of claim 8 further comprising:
balancing loads upon resources of said distributed server using stored estimated times of completion of prior requests by said distributed server.

10. The method of claim 1, wherein the server is a distributed server, the method further comprising:
storing said estimated time to complete said particular incoming request in at least one repository, wherein the at least one repository further stores the monitored completion times; and
using the stored estimated time and monitored completion times to perform load balancing across resources of the distributed server for processing further incoming requests.

11. A system comprising:
an access layer to manage incoming requests;
an application layer to process content of the incoming requests;
a data retrieval layer to access stored data;
at least one central processing unit (CPU);
wherein the access layer is to receive a particular incoming request from a remote requestor device, and the access layer is to dispatch threads of the access layer to handle corresponding incoming requests;
code executable on the at least one CPU to:
monitor a completion time associated with the access layer, a completion time associated with the application layer, a completion time associated with the data retrieval layer, and a number of the threads of the access layer that are concurrently executing in the system;
calculate an estimated time to complete the particular incoming request based on the monitored completion time of the access layer, the monitored completion time of the application layer, the monitored completion time of the data retrieval layer, and the monitored number of the threads of the access layer that are concurrently executing in the system; and communicate the estimated time to the remote requestor device.

12. The system of claim 11, wherein the system comprises a distributed server, and wherein the code is executable on the at least one CPU to further:

store the estimated time to complete the particular incoming request in at least one repository, wherein the at least one repository further stores the monitored completion times; and use the stored estimated time and monitored completion times to perform load balancing across resources of the distributed server for processing further incoming requests.

13. The system of claim 11, wherein the monitored completion times are stored in at least one repository, and the code is executable on the at least one CPU to further:

calculate estimated times for processing the particular incoming request at corresponding ones of the access layer, application layer, and data retrieval layer store the estimated times for corresponding ones of the access layer, application layer, and data retrieval layer in the at least one repository.

14. The system of claim 13, wherein the code is executable on the at least one CPU to further:

combine the estimated times for corresponding ones of the access layer, application layer, and data retrieval layer to calculate the estimated time to complete the particular incoming request.

15. The system of claim 13, wherein the access layer is to further receive a second incoming request from the remote requestor device, and wherein the code is executable on the at least one CPU to further:

calculate a second estimated time to complete the second incoming request based on the monitored completion times and the estimated times stored in the at least one repository and the monitored number of the threads of the access layer that are concurrently executing in the system; and communicate the second estimated time to the remote requestor device.

16. A computer readable storage device storing instructions that upon execution cause a server having at least one processor to:

monitor completion times associated with an access layer, an application layer, and a data retrieval layer of said server separately, wherein said access layer is to manage incoming requests, said application layer is to process content of the incoming requests, and said data retrieval layer is to access stored data;

receive a particular incoming request from a remote requestor device via said access layer of said server, wherein said access layer is to dispatch threads of said access layer to handle corresponding incoming requests;

monitor a number of the threads of said access layer that are concurrently executing in the server;

calculate an estimated time to complete said particular incoming request based on the monitored completion time of said access layer, the monitored completion time of said application layer, the monitored completion time of said data retrieval layer, and the monitored number of the threads of said access layer that are concurrently executing in the server; and communicate said estimated time to said remote requestor device.

17. The computer readable storage device of claim 16, wherein the server comprises a distributed server, and wherein the instructions upon execution cause the server to further:

store the estimated time to complete the particular incoming request in at least one repository, wherein the at least one repository further stores the monitored completion times; and use the stored estimated time and monitored completion times to perform load balancing across resources of the distributed server for processing further incoming requests.

18. The computer readable storage device of claim 16, wherein the monitored completion times are stored in at least one repository, and the instructions upon execution cause the server to further:

calculate estimated times for processing the particular incoming request at corresponding ones of the access layer, application layer, and data retrieval layer store the estimated times for corresponding ones of said access layer, application layer, and data retrieval layer in the at least one repository.

19. The computer readable storage device of claim 18, wherein the instructions upon execution cause the server to further:

combine the estimated times for corresponding ones of said access layer, application layer, and data retrieval layer to calculate the estimated time to complete the particular incoming request.

20. The computer readable storage device of claim 18, wherein the instructions upon execution cause the server to further:

receive a second incoming request from the remote requestor device via the access layer;

calculate a second estimated time to complete said second incoming request based on the monitored completion times and the estimated times stored in the at least one repository and the monitored number of the threads of said access layer that are concurrently executing in the server; and communicate the second estimated time to said remote requestor device.

21. The computer readable storage device of claim 16, wherein the instructions upon execution is to cause the server to further:

determine a latency associated with a network between the remote requestor device and the server, wherein the estimated time is further calculated based on the determined latency.

* * * * *